US012783083B2

(12) United States Patent
Wang et al.

(10) Patent No.: US 12,783,083 B2
(45) Date of Patent: Nov. 3, 2026

(54) VARIABLE RATE TOUCH SAMPLING

(71) Applicant: QUALCOMM Incorporated, San Diego, CA (US)

(72) Inventors: Jun Wang, Shanghai (CN); Rufeng Xu, Shanghai (CN); Sheng Fang, Shanghai (CN); Fei Liang, Shanghai (CN); Li Li, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 19/125,286

(22) PCT Filed: Nov. 18, 2022

(86) PCT No.: PCT/CN2022/132736

§ 371 (c)(1),
(2) Date: Apr. 28, 2025

(87) PCT Pub. No.: WO2024/103365

PCT Pub. Date: May 23, 2024

(65) Prior Publication Data

US 2026/0169584 A1 Jun. 18, 2026

(51) Int. Cl.

*G06F 3/041* (2006.01)
*G06F 3/044* (2006.01)
*G06F 3/0488* (2022.01)

(52) U.S. Cl.

CPC ........ *G06F 3/04166* (2019.05); *G06F 3/0412* (2013.01); *G06F 3/041661* (2019.05); *G06F 3/0446* (2019.05); *G06F 3/0488* (2013.01)

(58) Field of Classification Search

CPC ............... G06F 3/0416; G06F 3/04166–04186
See application file for complete search history.

(56) References Cited

U.S. PATENT DOCUMENTS

| | | | | |
|---|---|---|---|---|
| 9,182,843 | B2 * | 11/2015 | Munechika | G06F 3/0446 |
| 10,739,994 | B2 * | 8/2020 | Kim | G06F 3/045 |

(Continued)

FOREIGN PATENT DOCUMENTS

| | | | | |
|---|---|---|---|---|
| CN | 109542272 A * | 3/2019 | | G06F 1/3259 |
| WO | 2013110194 A1 | 8/2013 | | |

OTHER PUBLICATIONS

International Search Report and Written Opinion—PCT/CN2022/132736—ISA/EPO—Jul. 20, 2023.

*Primary Examiner* — Patrick F Marinelli
(74) *Attorney, Agent, or Firm* — Polsinelli

(57) ABSTRACT

Systems and techniques are described herein for providing variable rate touch sampling for touch sensors. In one illustrative example, a method of processing one or more touch inputs includes determining whether a number of touch inputs received during a first time associated with a scan of a first portion of a touch screen corresponds to a high frequency touch rate or a low frequency touch rate. Based on a determination that the number of touch inputs received during the first time corresponds to the high frequency touch rate, the method can include analyzing the first portion of the touch screen associated with the high frequency touch rate for one or more touch inputs at a first scan rate and a second portion of the touch screen associated with the low frequency touch rate at a second scan rate (which can be lower than the first scan rate).

20 Claims, 9 Drawing Sheets

(56) References Cited

U.S. PATENT DOCUMENTS

| | | | | |
|---|---|---|---|---|
| 11,893,182 | B2 * | 2/2024 | Chen | G06V 10/235 |
| 11,990,075 | B2 * | 5/2024 | Zheng | G06F 1/3265 |
| 2009/0315826 | A1 * | 12/2009 | Lin | G06F 3/04883 345/157 |
| 2011/0285644 | A1 * | 11/2011 | Chang | G06F 3/041661 345/173 |
| 2012/0317520 | A1 * | 12/2012 | Lee | G06F 3/04817 715/863 |
| 2014/0184518 | A1 | 7/2014 | Valavi | |
| 2014/0313146 | A1 * | 10/2014 | Munechika | G06F 3/041 345/173 |
| 2015/0062023 | A1 * | 3/2015 | Collins | G06F 1/3262 345/173 |
| 2015/0084872 | A1 | 3/2015 | Han et al. | |
| 2016/0231848 | A1 * | 8/2016 | Lin | G06F 1/3262 |
| 2018/0011588 | A1 * | 1/2018 | Lu | G06F 3/041661 |
| 2020/0401308 | A1 | 12/2020 | Wu | |
| 2023/0021934 | A1 * | 1/2023 | Chen | G06V 40/1335 |
| 2023/0127696 | A1 * | 4/2023 | Zheng | G06F 1/3262 345/204 |
| 2026/0169584 | A1 * | 6/2026 | Wang | G06F 1/3262 |

* cited by examiner

VARIABLE RATE TOUCH SAMPLING

CROSS-REFERENCE TO RELATED APPLICATION

This application is a 371 National Stage of PCT Application No. PCT/CN2022/132736, filed on Nov. 18, 2022, entitled "VARIABLE RATE TOUCH SAMPLING", and assigned to the assignee hereof. The disclosure of the prior Application is considered part of and is incorporated by reference into this Patent Application.

FIELD

The present application is generally related to sensors for receiving touch input. For example, aspects of the present disclosure relate to systems and techniques for providing variable rate touch sampling for touch sensors.

BACKGROUND

Electronic devices (e.g., mobile devices and other electronic devices) can communicate audio (e.g., speech or voice) and data packets over wireless networks. Such devices can also provide additional functionality via one or more applications, such as capturing images using a digital still camera, capturing video using a digital video camera, recording data (e.g., audio, image data, video, etc.) using a digital recorder, outputting audio (e.g., streaming music or a music file, book content, etc.) using an audio player, and/or other functionalities.

Smartphones and similar electronic devices that are configured with touchscreens (e.g., tablets, laptops, etc.) including touch sensors capable of detecting and distinguishing various touch inputs, including multi-finger touches. Recent electronic devices have incorporated touch screens with higher refresh rate to reduce latency and increase the quality of motion on the electronic device, such as scrolling displayed content.

SUMMARY

In some examples, systems and techniques are described for providing variable rate touch sampling for touch sensors (e.g., for high refresh rate displays). The systems and techniques can reduce latency associated with input in high refresh rate displays while limiting power consumption.

According to at least one example, a method is provided for processing one or more touch inputs. The method includes: determining whether a number of touch inputs received during a first time associated with a scan of a first portion of a touch screen corresponds to a high frequency touch rate or a low frequency touch rate; and based on a determination that the number of touch inputs received during the first time corresponds to the high frequency touch rate, analyzing the first portion of the touch screen associated with the high frequency touch rate for one or more touch inputs at a first scan rate and a second portion of the touch screen associated with the low frequency touch rate at a second scan rate, the first scan rate being higher than the second scan rate.

In another example, an apparatus for processing one or more touch inputs is provided that includes at least one memory and at least one processor coupled to the at least one memory. The at least one processor is configured to: determine whether a number of touch inputs received during a first time associated with a scan of a first portion of a touch screen corresponds to a high frequency touch rate or a low frequency touch rate; and based on a determination that the number of touch inputs received during the first time corresponds to the high frequency touch rate, analyze the first portion of the touch screen associated with the high frequency touch rate for one or more touch inputs at a first scan rate and a second portion of the touch screen associated with the low frequency touch rate at a second scan rate, the first scan rate being higher than the second scan rate.

In another example, a non-transitory computer-readable medium is provided that has stored thereon instructions that, when executed by one or more processors, cause the one or more processors to: determine whether a number of touch inputs received during a first time associated with a scan of a first portion of a touch screen corresponds to a high frequency touch rate or a low frequency touch rate; and based on a determination that the number of touch inputs received during the first time corresponds to the high frequency touch rate, analyze the first portion of the touch screen associated with the high frequency touch rate for one or more touch inputs at a first scan rate and a second portion of the touch screen associated with the low frequency touch rate at a second scan rate, the first scan rate being higher than the second scan rate.

In another example, an apparatus for processing one or more touch inputs is provided. The apparatus includes: means for determining whether a number of touch inputs received during a first time associated with a scan of a first portion of a touch screen corresponds to a high frequency touch rate or a low frequency touch rate; and based on a determination that the number of touch inputs received during the first time corresponds to the high frequency touch rate, means for analyzing the first portion of the touch screen associated with the high frequency touch rate for one or more touch inputs at a first scan rate and a second portion of the touch screen associated with the low frequency touch rate at a second scan rate, the first scan rate being higher than the second scan rate.

In some aspects, one or more of the apparatuses described herein is, is part of, and/or includes a mobile device (e.g., a mobile telephone and/or mobile handset and/or so-called "smartphone" or other mobile device), an extended reality (XR) device (e.g., a virtual reality (VR) device, an augmented reality (AR) device, or a mixed reality (MR) device), a head-mounted device (HMD) device, a vehicle or a computing system, device, or component of a vehicle, a wearable device (e.g., a network-connected watch or other wearable device), a wireless communication device, a camera, a personal computer, a laptop computer, a server computer, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensors).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following figures.

DETAILED DESCRIPTION

Figure 1:
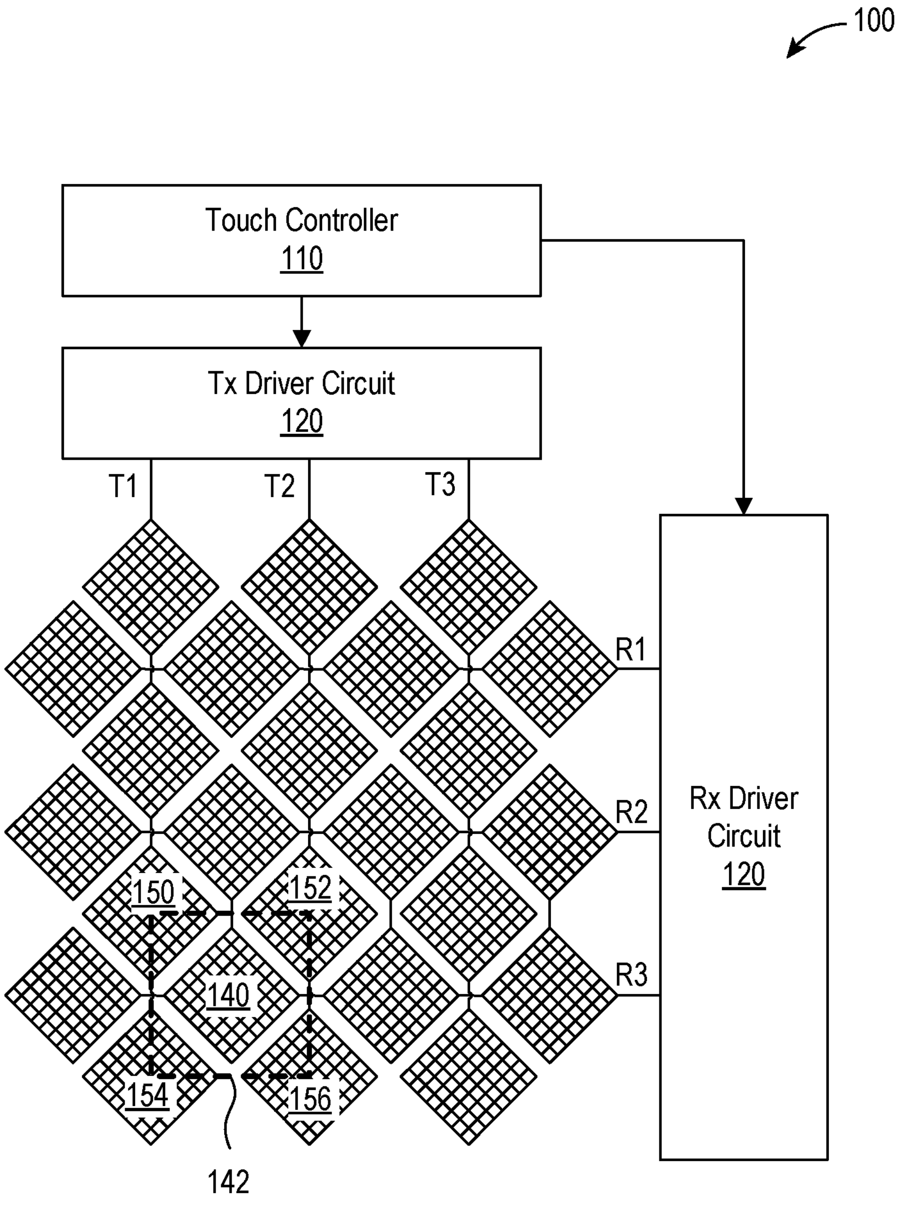
FIG. 1 is a touch sensor that can be integrated into a computing device or attached to a display, in accordance with some aspects of the disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and descriptions are not intended to be restrictive.

The ensuing description provides example aspects only and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The terms “exemplary” and/or “example” are used herein to mean “serving as an example, instance, or illustration.” Any aspect described herein as “exemplary” and/or “example” is not necessarily to be construed as preferred or advantageous over other aspects. Likewise, the term “aspects of the disclosure” does not require that all aspects of the disclosure include the discussed feature, advantage or mode of operation.

As noted previously, electronic devices may be configured to receive touch input via touch sensors and intelligently process the touch input to perform one or more functions associated with one or more applications (e.g., multimedia applications, such as games, media content applications, etc.). For example, touch input may be provided by a user to control an electronic device, causing the electronic device to output audio content (e.g., music content, book content, etc.), communicate with other people, create content such as a digital painting or a document, engage in various forms of entertainment such as consuming audio or video media, and/or perform other functions. One common form of entertainment includes a digital game, where a user can interact with the game to perform various functions using a variety of touch inputs via a touch screen of an electronic device. For example, touch inputs can be related to racing a virtual car within a three-dimensional (3D) world that is presented to the user on the touch screen of the electronic device.

Multimedia application content (e.g., games and other visual media) are affected by the frame rate or the rate at which frames are generated and displayed over a unit of time. In some aspects, frames may also be referred to as images, and the frame rate is often referred to as the refresh rate. Higher frame rates improve the user experience and increase user engagement. Examples of frame rates that may provide an adequate experience for certain applications (e.g., a gaming application, an extended reality (XR) application, etc.) include 30 frames per second (FPS) (corresponding to a refresh rate of 30 Hertz (Hz)), 60 FPS (corresponding to 60 Hz), 120 FPS (corresponding to 120 Hz), or higher frame rates. For instance, some electronic devices may include displays with a refresh rate of 60 Hz to provide a smooth experience. Newer electronic devices include touch screens with increased refresh rates, such as 120 Hz. Such devices are capable of scanning the entire touch screen for touch input at a particular scan rate (e.g., a scan rate of 120 Hz), which is also referred to as a touch scan rate, touch rate, or a sample rate.

Consumers of multimedia applications, such as games, desire better player experiences, which can be achieved by increasing the frame rate. However increased frame rate can result in input latency between the time a touch input is received and a time at which a result of the corresponding input is displayed (e.g., a character is moved, an action is performed, etc.). Such input latency can decrease user engagement and experience. Touch sensors may have an increased touch scan rate, but the increased scan rate often provides no benefit for conventional use and may consume a significant amount of power. Even in multimedia applications that benefit from the increased touch scan rate, a portion of the screen may benefit from the higher scan rate while other portions may not.

In some aspects, systems, apparatuses, processes (also referred to as methods), and computer-readable media (collectively referred to herein as “systems and techniques”) are described for providing variable rate touch sampling for touch sensors, which can improve touch sensors in electronic devices. The systems and techniques can enable different touch scan rates (or sampling rates or intervals) for a touch sensor of a touch screen. For example, a first scan rate (e.g., 240 Hz) can correspond to a default scan rate in which one or more portions of the touch screen are scanned for touch input and a second scan rate can correspond to a higher scan rate (e.g., 720 Hz) in which one or more other portions of the touch screen are scanned for touch input. A scan according to the second scan rate can occur one or more times between each scan associated with the first scan rate. For example, the touch sensor can identify at least one portion of a touch screen to scan for touch inputs according to the second scan rate (e.g., during each interval of the second scan rate). The touch sensor can be configured to provide current to a portion of the touch electrodes of the touch sensor at the second sampling rate and current to other portions of the touch electrodes of the touch sensor at the first sampling rate to reduce power consumption. The touch sensor can also convert a portion of detected capacitances in the touch electrodes to identify touch inputs during intervals of the first and second scan rates.

In some aspects, the touch sensor can determine whether a number of touch inputs received during a first time associated with a scan of a first portion of a touch screen corresponds to a high frequency touch rate or a low frequency touch rate. For example, the high frequency touch rate can be based on touch inputs in a unit area (e.g., the first portion) of the touch screen within a time period being greater than a first threshold, and the low frequency touch rate can be based on the number of touch inputs in a unit area of the touch screen within a time period being less than or equal than the first threshold. In one illustrative example, the first threshold can be set to 3 touch inputs within a 30-second interval. In one illustrative example, the touch sensor can, based on a determination that the number of touch inputs received during first time corresponds to the high frequency touch rate, analyze the first portion of the touch screen associated with the high frequency touch rate for one or more touch inputs at a first scan rate and a second portion of the touch screen associated with the low frequency touch rate at a second scan rate (e.g., without considering a second portion of the touch screen associated with the low frequency touch rate), where the first scan rate is higher than the second scan rate. In another illustrative example, the touch sensor may analyze, based on a determination that the number of touch inputs received during the first time corresponds to the low frequency touch rate, the first portion of the touch screen and the second portion of the touch screen (or an entire touch screen) for touch input at the second scan rate.

The systems and techniques reduce the power consumption of the high touch scan rate touch sensors by reducing current consumption by omitting current pulses on lines associated with the touch sensor, reduce computations by omitting large portions of the touch screen from the higher rate sampling, and improve latency associated with high fidelity input. In some aspects, the systems and techniques can be adaptively implemented by providing various application programming interface (API) endpoints to allow the system to control the touch scan rate, or an application to control the touch scan rate.

Additional details and aspects of the present disclosure are described in more detail below with respect to the figures.

FIG. 1 is a touch sensor 100 that can be integrated into a computing device or attached to a display in accordance with some aspects of the disclosure. In some aspects, the touch sensor 100 can be mounted to or integrated into a display panel, such as a liquid crystal display (LCD), a field emission display (FED), a plasma display panel (PDP), an organic light emitting diode (OLED) display, and an electrophoresis display (EPD). The touch sensor includes a touch controller 102 that is configured to control a Tx driver circuit 120 coupled to the Tx lines, which are labeled T1-T3, and an Rx driver circuit 130 coupled to the Rx lines, which are labeled R1-R3. In one example, the Tx driver circuit 120 and the Rx driver circuit 130 may be integrated into a readout integrated circuit (ROIC). A plurality of electrodes a coupled to each Tx and Rx line, and the electrodes associated with the Tx lines are on a separate layer from the electrodes associated with the Tx lines.

In some aspects, the touch controller 110 is configured to enable the Tx driver circuit 120 and the Rx driver circuit 130 to control the detection of touch input in the touch sensor 100. For example, the touch controller causes the Tx driver circuit 120 to provide a touch driving pulse (e.g., a current) to the Tx lines T1-T3 during a sensing interval. The touch controller 110 can also cause the Rx driver circuit 130 to read a voltage on the Rx lines R1-R3 and sample the sensor node voltage. Each Tx line and Rx line can be referred to as a touch channel because touches within that row or column can be detected when the entire row or column is excited. The Rx driver circuit 130 may include an analog-to-digital converter that converts a detected node voltage into raw data. The Rx driving circuit may transmit the raw data to the touch controller 110.

The touch controller 110 is configured to receive the raw data and convert the raw data to touch data, such as a cartesian coordinate that identifies the location of each touch input on the touch screen. For example, the touch controller 110 extracts a touch area associated with the touch data and sets a computation block consisting of four sides (or four boundaries) surrounding the touch area at the shortest distance to increase a touch computation speed. The touch controller 110 performs a touch computation on the raw data associated with a computation block and calculates a touch coordinate value of the touch area. For example, a computation block associated with electrode 140 can identify capacitances from electrodes 150, 152, 154, and 156 to electrode 140, and identify a position of the touch based on the different capacitance values. As illustrated in FIG. 1, the electrode 140 can be used to detect a location identified of a touch-based on different capacitances formed by a finger to the various electrodes within boundary 142. The touch controller 110 may correct the touch coordinate value based on the position of the computation block and map the touch coordinate to a resolution of the display panel. In some cases, the touch controller 110 outputs the touch coordinate using a human interface device (HID) format.

The touch sensor 100 illustrated in FIG. 1 is illustrated as a capacitive sensor, but the touch sensor can use another technique such as resistance to identify the position of the touch input.

Conventional touch screens may have limited refresh rates (e.g., limited to a refresh rate of 60 Hz). Touch sensors integral to touch screens perform a touch detection (or a touch scan) of the entire screen at a fixed touch rate that is greater than the refresh rate, such as 120 Hz. As display panels increase their refresh rate to improve display for consumers, for example to a refresh rate 120 Hz, users may experience input latency, particularly within applications that benefit from high-accuracy input such as games, or artistic applications. Increasing touch scan rates to accommodate higher refresh rates can reduce input latency, but will increase power consumption and reduce battery life.

As noted above, according to some aspects, the systems and techniques described herein relate to increasing touch scan rates for portions of a screen based on accumulated input. For example, in some applications that enable high refresh rates (e.g., a multiplayer game), only a portion of the touch screen may be configured to receive touch input that will control the application, whereas and the majority of the screen can be configured to output visual information of that application. The systems and techniques can increase touch scan rates for a portion of the screen (e.g., associated with the portions that are configured to receive touch input) based on accumulated input to reduce power consumption at high touch scan rates. In some aspects, a portion of a screen that receives a minimum amount of input (corresponding to a high frequency touch rate) will be scanned at a higher touch scan rate and is referred to as a hot zone, and a portion of the touch screen that receives less than the minimum amount of input (corresponding to a low frequency touch rate) will be scanned at a lower touch scan rate and is referred to as a cold zone. For example, the high frequency touch rate can be based on a number of touch inputs in a portion (or unit area) of the touch screen within a time period being greater than a threshold. The low frequency touch rate can be based on a number of touch inputs in a portion of the touch screen within a time period being less than or equal than the threshold.

Figure 2:
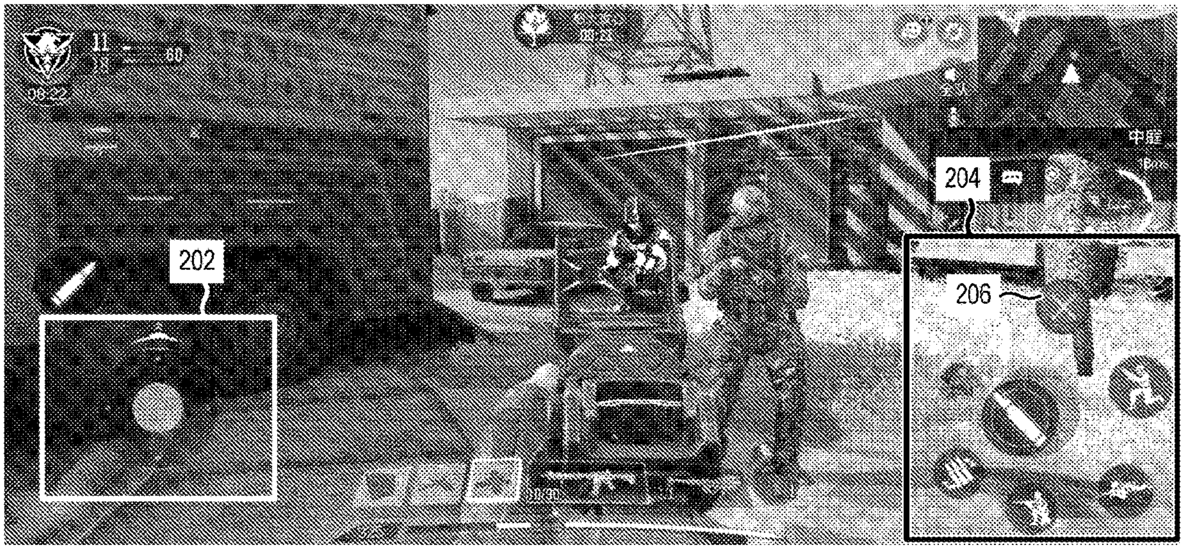
FIG. 2 is a screenshot of an application that executes at a high frame rate to provide smooth animations and has at least one hot zone, in accordance with some aspects of the disclosure.

FIG. 2 is a screenshot of an application that executes at a high frame rate to provide smooth animations and has at least one hot zone in accordance with some aspects of the disclosure. As illustrated in FIG. 2, the application comprises a single-player or a multiplayer game that has an increased frame rate to improve the fidelity of the experience. Higher frame rates in games provide a better experience and increase the enjoyment of the activity. In the single-player or multiplayer game illustrated in FIG. 2, the single-player or multiplayer game includes a left region 202 for controlling movement within the game, and a right region 204 for providing commands for the character within the game to perform, such as crouch, jump, reload, shoot, and so forth. The user of the single-player or multiplayer game illustrated in FIG. 2 primarily inputs touch input in the left region 202 and the right region 204, and the left region 202 and the right region 204 can be determined to be hot zones.

In some aspects, although the left region 202 and the right region 204 encompass all available inputs for the single-player or multiplayer game, the hot zones can exclude one or more portions of the left region 202 or the right region 204. For example, the systems and techniques can determine that a cancel input 206 within the right region 204 is infrequently input, and reduce the hot zone to exclude the cancel input 206.

In some aspects, the hot zones may be detected dynamically using inputs accumulated over a period of time. For example, the hot zones can be periodically reassessed (e.g., every 30 seconds) to reduce input latency. In some aspects, the identification of the touch inputs can be performed within the touch sensor itself, such as when an API requests the touch sensor to provide a higher touch rate. In this case, a software application that uses the API does not have to include any additional information and the dynamic touch scan rate is transparent to the software application. In other aspects, the API may include methods associated with controlling the hot zones, such as a property that identifies the different touch zones that are identified by the software application. The API itself interfaces with the hardware and provides data to the touch controller to cause the touch controller to read out touch inputs from the hot zone. In this case, a function to manage the hot zones and the cold zones is created within the software application.

In some aspects, areas of the touch sensor that are within the hot zones can be removed if a sufficient number of inputs is not received in a time frame. The number of inputs to remove the area is different because there is an increased touch scan rate, which multiplies the number of samples over a unit of time.

Figure 3:
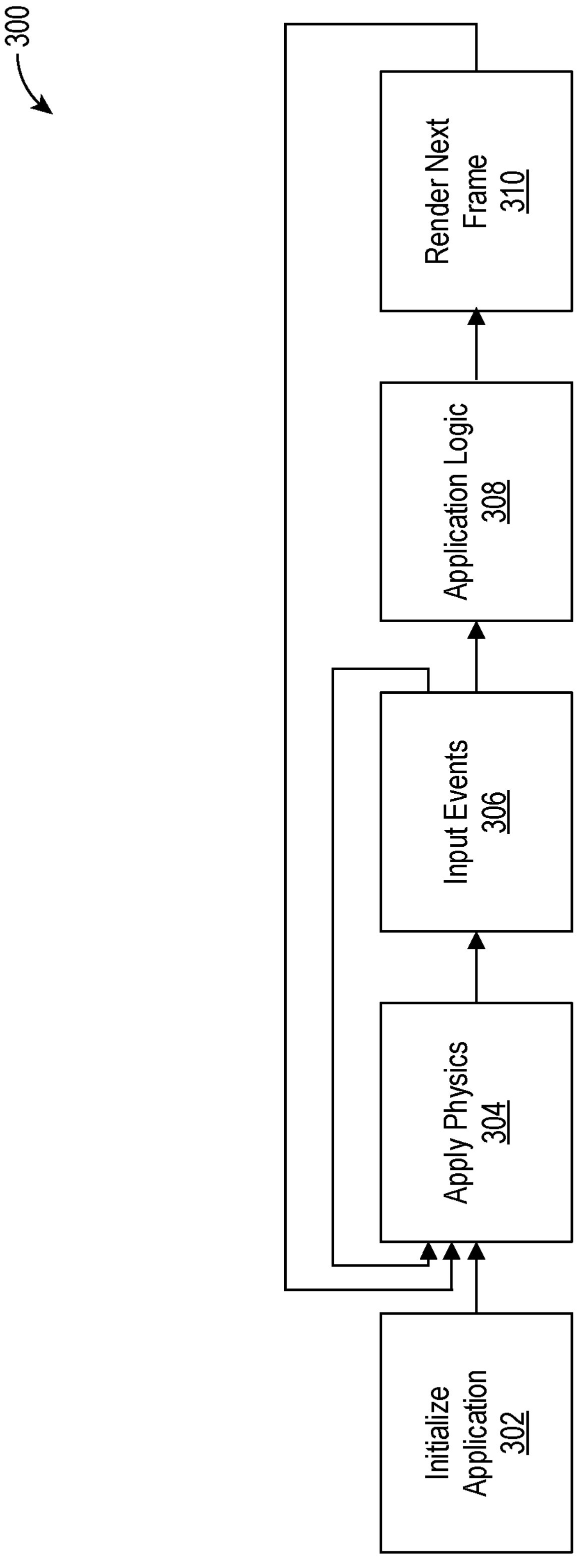
FIG. 3 is an illustration of an application loop of an application that is executed on a client device, in accordance with some aspects of the disclosure.

FIG. 3 is an illustration of an application loop of an application that is executed on a client device in accordance with some aspects of the disclosure. In some aspects, the client device includes a high refresh rate display (e.g., 120 Hz) and the application can provide a higher fidelity experience to the user by increasing its frame rate to improve the fluidity and the clarity of the motion.

In one illustrative aspect, the application causes the client device to perpetually execute the application loop until the application exits. For example, when the client application is started, the application loop begins by initializing the application at block 302. Operations at block 302 may include loading the application and necessary assets into memory, loading a rendering engine (e.g., Unity, Unreal Engine, etc.), connecting to a server to connect to a game, and configuring assets to begin rendering the application. The application will be referred to as a game, but the application can be a creative application for creating content or any other type of application that would benefit from higher frame rates.

After initialization, the application loop may apply physics at block 304 to objects within the virtual world. For example, if a ball is traversing at an initial trajectory, the movement of the ball is computed at block 304. Similarly, various other animations may be determined at block 304, such as triggering animation events, performing callback functions to various objects within the virtual world, applying inverse kinematic (IK) effects to objects within the game, etc. In some cases, the client device may be configured to apply physical effects (e.g., movement) to objects within the virtual world multiple times during the rendering of a single frame because a physics engine should be called on a consistent time interval to ensure accurate physics calculations.

At block 306, the application loop includes identifying any input events (e.g., user input from a screen, a game controller, or a head mounted display (HMD) input controller that a person manipulates to provide input. Operations at block 306 can also include network-related events such as receiving network data from a server and buffering the network data. The network data can identify events that occur within the game that is provided by a third party, such as another player within the multiplayer game.

In some aspects, the input events can occur at a higher rate based on the hot zones associated with the touch screen. For example, the touch screen can be configured for selective scanning of the touch screen at 720 Hz, or six times for every frame rendered at 120 Hz. Accordingly, the application loop returns to block 304 to apply physics based on the interval of time that has occurred. Applying the physics to the application calculates events within the application or game based on the input events received at block 306, thereby providing higher fidelity input. For example, a touch screen input for movement will be more accurate based on having additional samples and will reduce latency associated with the input. An example of accuracy and reduction of latency is illustrated with reference to FIGS. 7A and 7B.

The application loop exits the input events-physics loop when the next frame is determined to be rendered based on a local time of the application. For example, the application may use a current frame rate, which can be variable based on the complexity of the frame, to identify that the application logic of block 308 should execute. At block 308, the application performs logic functions associated with the physics and other input events. An illustrative example of a logic function of a game is to identify any collision events that occur within the game. For example, the logic function can determine whether a bullet strikes the player based on their current position or their current trajectory. In another aspect, the logic function of a creative application can include determining a non-linear path of a paint brush stroke based on the input events associated with the next frame.

In one illustrative aspect, the application logic can receive a collection of touch inputs (e.g., an array of touch inputs) provided between consecutive frames of the application. For example, different portions of the touch screen can be processed at different scan rates (or sampling rates) based on a number of the touch inputs received for the different portions. Providing such a variable rate touch sampling can decrease latency between touch events. In some cases, interpolating the touch inputs can improve the accuracy of the input when touch inputs are sampled at a higher rate. In conventional application logic, the events are processed in a fixed manner that can result in latency. For example, input associated with movement may be processed before input associated with actions. In the example of a racing game, the steering of the vehicle may be processed before acceleration or deceleration inputs (e.g., gas pedal inputs, brake pedal input) and a user may perceive latency based on the order of events that are applied to the application logic. In other aspects, the touch inputs can be processed to determine a higher accuracy input based on the additional touch inputs that are available. For example, a swiping touch input can be processed to identify linear direction. Other types of inputs may also be available with higher touch scan rates, such as the detection of rotation of a finger during input. For example, a painting application may benefit from the ability to detect rotation of the finger to provide additional types of input capable with conventional artist tools such as a pencil, a paintbrush, etc.

After the application logic, the application loop renders a frame based on the execution of the application logic at block 310 and then outputs the frame to the client device. After rendering and displaying the frame at block 310, the application loop returns to block 304 to execute the blocks 304 to 310 to render the next frame. In some aspects, the various blocks that are illustrated in FIG. 3 can be arranged in different orders, for example, the input can be provided before applying physics. In other cases, the application of physics can be associated with the time of the next frame, and the input events logic can be repeated without additional physics computations at block 304.

Figure 4:
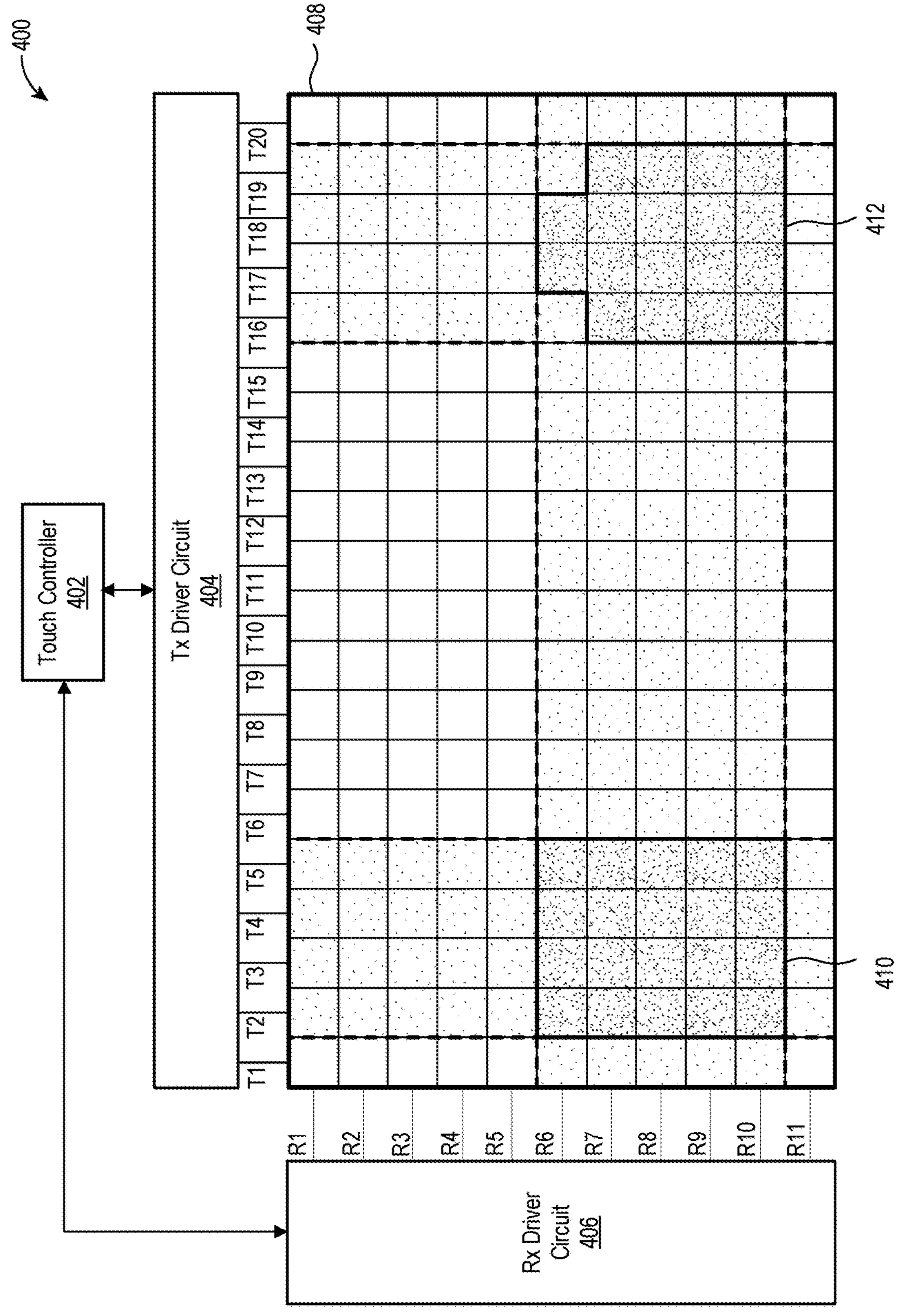
FIG. 4 is an illustration of a touch sensor integrated into a touch panel with hot zones that are activated at a higher touch scan rate, in accordance with some aspects of the disclosure.

FIG. 4 is an illustration of a touch sensor 400 integrated into a touch panel with hot zones that are activated at a higher touch scan rate (or sampling rate), in accordance with some aspects of the disclosure. The touch sensor 400 includes a touch controller 402, a Tx driver circuit 404, an Rx driver circuit 406, and the touch sensor 400 is configured to active electrodes within an electrode layer 408. In some aspects, a device that integrates the touch sensor 400 is configured to identify hot zones such as a left region 410 and a right region 412 of the touch panel using software or hardware controls. For example, the left region 410 can correspond to the left region 202, and the right region can correspond to the right region 204 in FIG. 2.

In some aspects, the touch sensor 400 is configured to control the touch panel to activate the channels of touch electrodes based on the identified hot zone. For example, the touch sensor can expose a control using an API to allow the software to identify portions of the touch panel to scan at a higher rate. In conventional touch sensors, the touch scan rate may not be exposed because the touch scan rate was fixed.

In the illustrated example, the touch controller 402 configures the Tx driver circuit 404 and the Rx driver circuit 406 to activate corresponding electrodes to obtain samples that enable the detection of touch input in the left region 410 and the right region 412 at higher touch scan rates. For example, if the touch controller 402 is capable of a touch scan rate of 720 Hz, the touch controller 402 causes the Tx driver circuit 404 to activate Tx lines T2, T3, T4, T5, T16, T17, T18, and T19 and the Rx driver circuit 406 to read Rx lines R6, R7, R8, R9, and R10. The Rx driver circuit 406 may include an analog-to-digital (ADC) and digitize the analog values and read out raw digital values to the touch controller 402. The touch controller 402 is configured to convert values and output associated with the left region 410 and the right region 412. The touch sensor 400 is configured to reduce power consumption by limiting the excitations of the Rx and Tx lines, sampling only a limited section of the touch sensor 400, and converting values associated with the left region 410 and the right region 412. Higher frequency touch scan rates can be provided for a portion of the touch screen and provide high-fidelity input.

Figure 5:
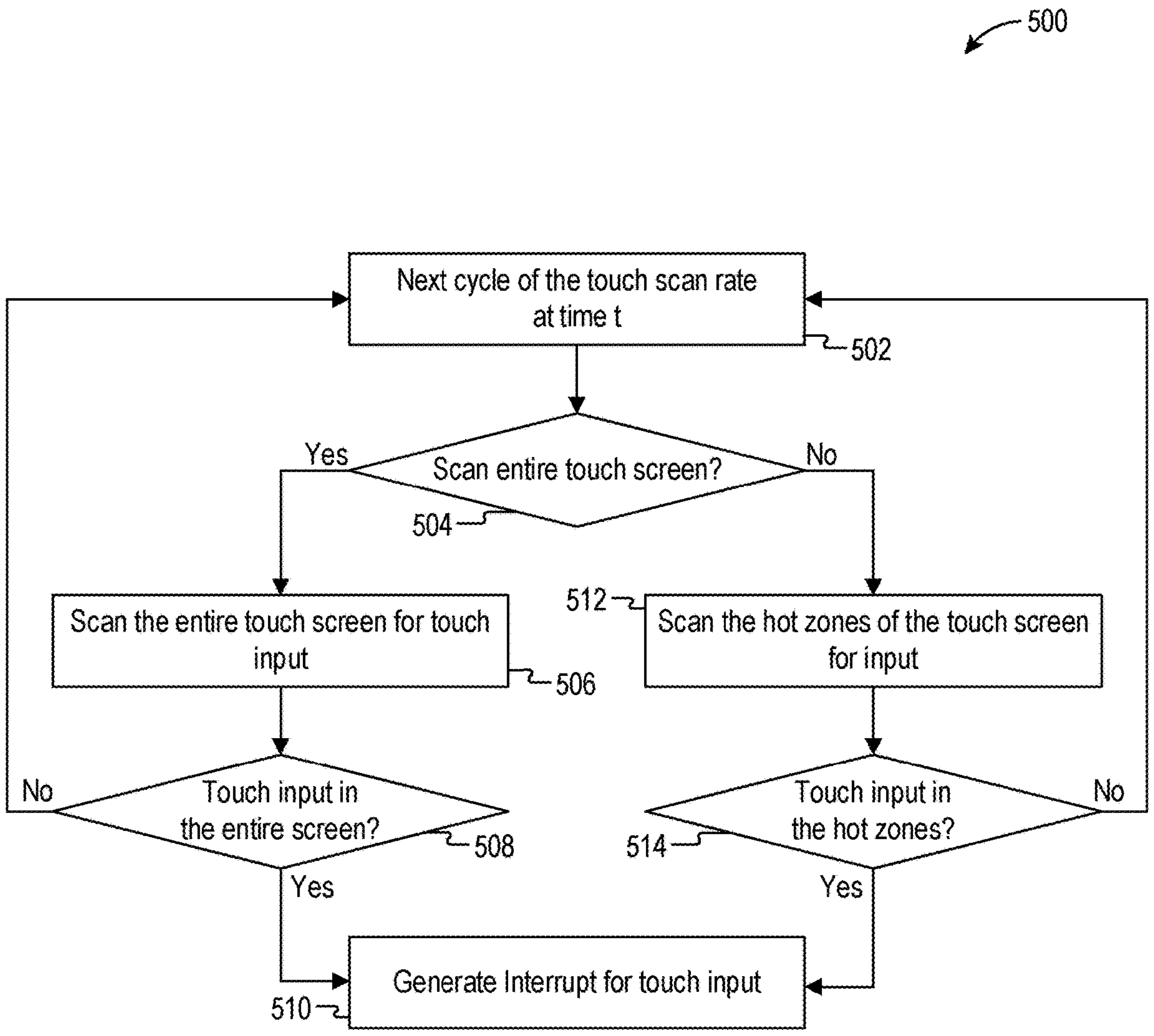
FIG. 5 illustrates a flowchart of a method of a touch screen for detecting touch input using hot zones, in accordance with some aspects of the disclosure.

FIG. 5 illustrates a flowchart of a method 500 of a touch screen for detecting touch input using hot zones in accordance with some aspects of the disclosure. In one aspect, a touch sensor integral or attached to a touch screen can perform all or part of the method 500, and the touch sensor can be configured to scan for touch input at a higher rate than a high refresh rate of the touch screen. Generally, the touch scan rate is equal to the refresh rate of the touch screen scaled by an integer N (e.g., touch scan rate=maximum display frame rate×N). For example, if the touch screen is capable of a 120 Hz frame rate, the touch scan rate of the touch sensor in the touch screen may be 720 Hz, and the integer N is 6. However, in some cases, the value of N may be a floating value (e.g., 2.5).

Initially, at block 502, the touch screen can detect the next cycle of the touch scan at a time t. At block 504, the touch screen can determine whether to scan the entire touch screen. For example, if the result of a modulus of the current time t and the integer N is zero (e.g., t % N==0), the touch screen determines to scan the entire touch screen as every N cycles of the higher touch scan rate corresponds to the lower touch scan rate. If the touch screen determines to scan the entire touch screen, the touch screen proceeds to block 506.

At block 506, the touch screen scans the entire touch screen for touch input. For example, the touch screen would cause the touch sensor 400 of FIG. 4 to scan all Tx lines and all Rx lines to identify touch input anywhere on the touch screen. At block 508, the touch sensor determines if there is a touch input anywhere on the entire screen. If there is not any touch input, the touch screen returns to block 502 to wait for the next interval of the touch scan rate. If a touch input is detected at block 508, the touch screen proceeds to block 510. At block 510, the touch screen generates an interrupt for the touch input, which causes a processor (e.g., the main processor of a device that includes the touch screen) to receive and process the touch inputs detected on the entire screen.

Referring back to block 504, if the result of a modulus of the current time t and the integer N is not zero, the touch sensor determines that the entire screen is not scanned for touch input and the touch sensor proceeds to block 512. At block 512, the touch screen scans the hot zones of the touch screen for input. For example, the touch screen would cause the touch sensor 400 of FIG. 4 to scan all Tx lines and all Rx lines to identify touch input anywhere on the touch screen would activate Tx lines T2, T3, T4, T5, T16, T17, T18, and T19 and Rx lines R6, R7, R8, R9, and R10, and identify touch input events in the left region 410 and the right region 412. For example, touch inputs outside of the left region 410 and the right region 412 are not detected in this cycle.

At block 514, the touch screen determines if there are any touch inputs in the hot zones. If no touch inputs are detected at block 514, the touch screen returns to block 502 to wait for the next cycle of the touch scan rate. If touch input determines there are touch inputs in the hot zones at block 514, the touch screen proceeds to block 510 and generates an interrupt to cause the processor to receive and process the touch inputs detected on the hot zones. For example, the touch screen may only convert touch input values associated with the hot zones, such as the left region 410 and the right region 412 in FIG. 4.

In one illustrative aspect, the touch screen may detect input that occurs begins before the current cycle based on that input being outside of the hot zone. For example, because the higher frequency touch scan rate detects touch inputs within the hot zone (e.g., the left region 410 and the right region 412), a touch input can occur in the touch screen before the current cycle of the touch scan rate. In this case, there is a latency associated with the touch input from the time when the touch input occurs and when the touch input is detected and processed within the application. As described above with reference to FIG. 2, the cold zones are locations where input is less frequent, and the latency does not have a significant impact on the user experience.

Figure 6:
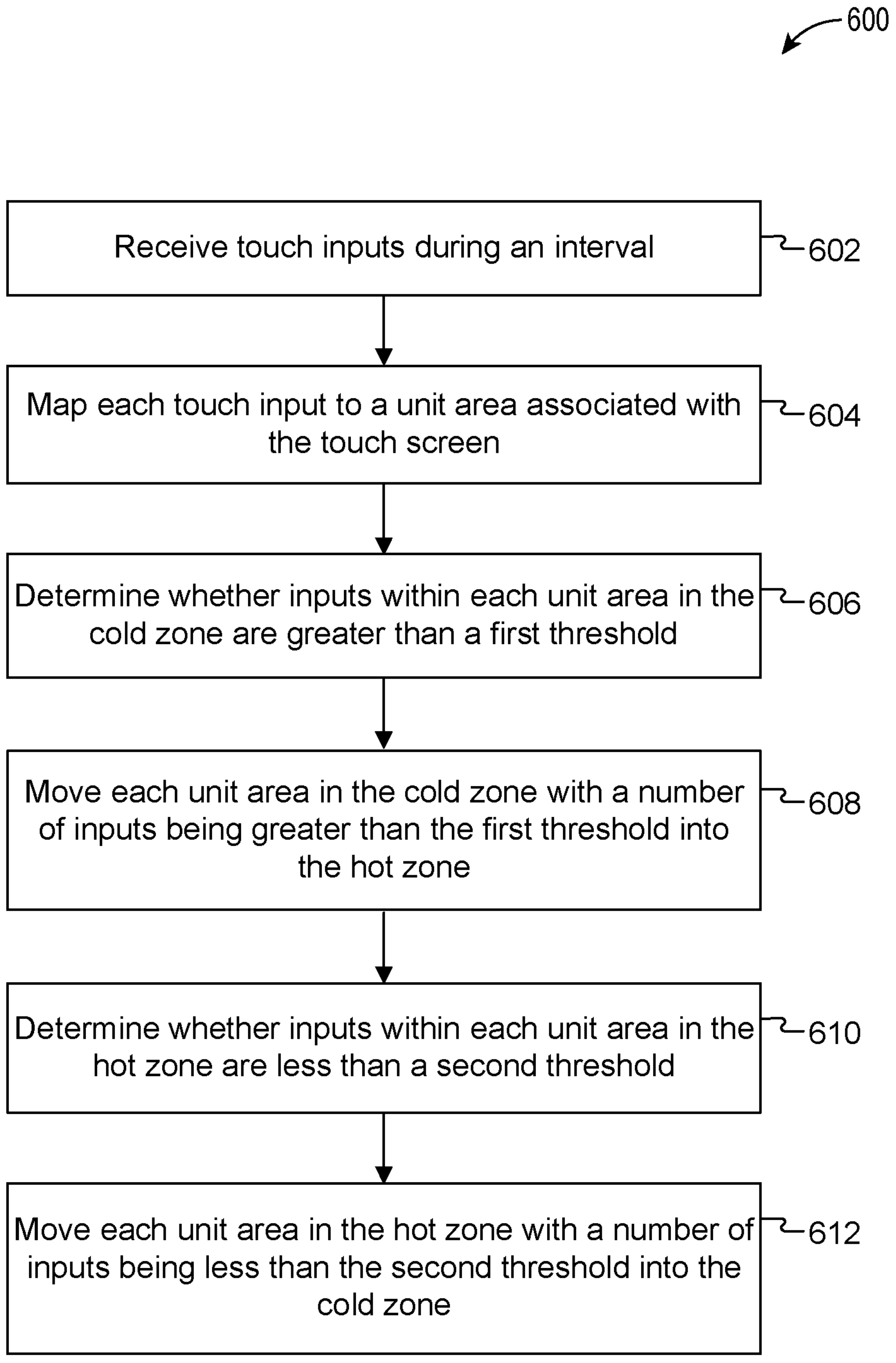
FIG. 6 illustrates a flowchart of a method for identifying hot zones, in accordance with some aspects of the disclosure.

FIG. 6 illustrates a flowchart of a method 600 for identifying hot zones in accordance with some aspects of the disclosure. In one aspect, the method 600 may be performed by a touch screen or a computing system including a processor to identify frequently accessed regions of the touch screen. For example, the method 600 can be used to identify hot zones and cold zones and provide the identification of the hot zones to a touch screen or touch screen sensor. The touch screen or touch screen sensor may perform the method illustrated in FIG. 5 to scan the hot zone at a higher touch scan rate to reduce latency associated with an input.

At block 602, the computing system may receive touch inputs during an interval. In some cases, the interval may be fixed periods of time, such as 1 minute. In other cases, the interval may vary depending on the state of the application that is receiving touch inputs. For example, when the application begins executing a primary function (e.g., playing a game, painting in a drawing function, etc.), the interval may be shorter or longer.

At block 604, the computing system may map each touch input into a unit area associated with the touch screen. In one aspect, the unit areas may be associated with different channels or Tx/Rx lines of a touch sensor. For example, a touch sensor 400 divides includes 20 columns and 11 rows, which corresponds to 220 distinct unit areas corresponding to T1, R1 to T20, R11. In some aspects, the computing system may receive a location of a pixel or area of pixels corresponding to the input, and the computing system may map each touch input into at least one unit area. The computing system may store the touch inputs into a buffer that can be used to dynamically identify the hot and cold zones. In another aspect, a list of key-value pairs, a dictionary (also referred to as a map or a hash) can distinctly identify each unit area, and touch input is accumulated.

At block 606, the computing system determines whether a number of inputs into each unit area within the cold zone is greater than a first threshold. For example, the first threshold may be 15 distinct inputs. In some cases, the touch inputs can be related to time because each touch input represents a duration that the touch input occurs and the threshold may be related to a duration. For example, a movement control that moves a character in a game may be held constantly, but the locations of the touch can change.

At block 608, the computing system may move each unit area in the cold zone with a number of inputs being greater than the first threshold into the hot zone. For example, when the game begins, no hot zones may be allocated and the entire screen corresponds to the cold zone. After 30 seconds, the computing system may identify that touch is continually received in a movement control region (e.g., the left region 202 in FIG. 2 designated as a hot zone) and the number of inputs exceeds the threshold. The computing system identifies and moves these unit areas from the cold zone to the hot zone, thereby increasing the touch rate for the movement control region.

At block 610, the computing system may determine whether each unit area in the hot zone are less than a second threshold. In some aspects, the second threshold is different from the first threshold because the number of detected touch inputs is higher in light of the higher touch scan rate.

At block 612, the computing system may move each unit area in the hot zone with the number of inputs being less than the second threshold into the cold zone. For example, a region may be touched frequently for a portion of the application for various reasons, such as a puzzle within a game. The computing system may dynamically remove unit areas of the touch sensor during run time to reduce power consumption and increase battery performance.

Although the method 600 identifies individual unit areas, the method can be supplemented or modified with various techniques. An illustrative example of a supplemental technique can be identifying a boundary associated with input distribution to identify a square region that corresponds to a high priority of the touch input. For example, a lower left corner and an upper right corner can be identified that correspond to high-frequency input, and each unit area within the boundary formed by the lower left corner and the upper right corner can be assigned to the hot zone.

In some aspects, the dynamic assignment of hot zone and cold zones improves input latency and improves the user experience. For example, the user can provide more accurate input, the input can be processed in the correct order, and the application can more timely respond to input to improve user engagement.

Figure 7A:
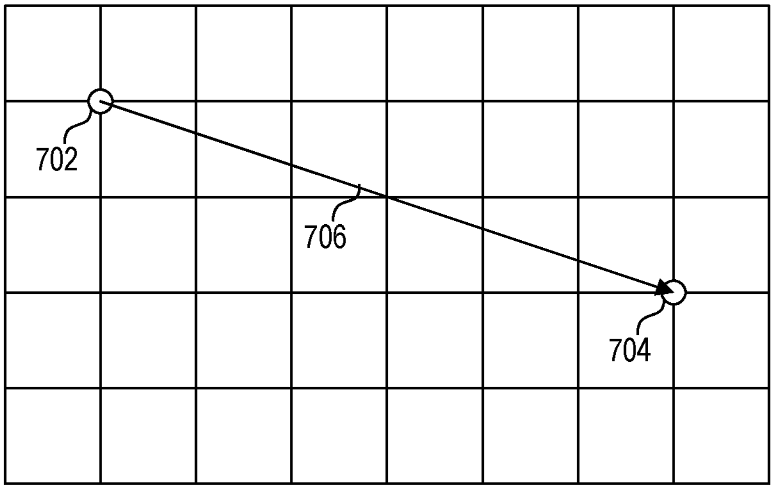
FIGS. 7A and 7B are conceptual illustrations of an input in two different touch sensors, in accordance with some aspects of the disclosure.
Figure 7B:
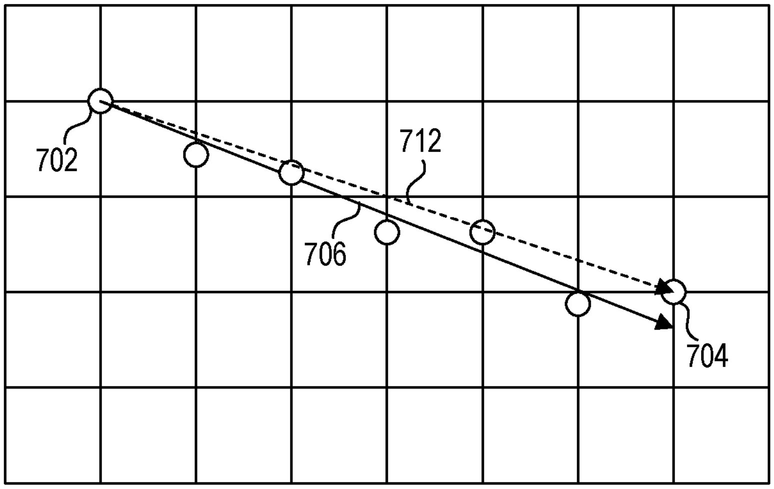

FIGS. 7A and 7B are conceptual illustrations of input in two different touch sensors in accordance with some aspects of the disclosure. In particular, FIG. 7A illustrates a conventional touch sensor with a touch scan rate of 120 Hz, having a first input 702 and a second input. The first input 702 and the second input 704 are sequential, with the first input being detected at 0 milliseconds (ms) and the second input 704 is detected at 8.3 ms. In some aspects, the conversion of the touch input includes some errors due to variations in the touch sensor, and quantization from the analog domain into the digital domain. A vector 706 represents the direction of input based on the detected touch input.

FIG. 7B illustrates a touch sensor capable of a higher touch scan rate than the touch sensor in FIG. 7A, and illustrates the same touch input depicted in FIG. 7A. Although the touch begins at the first input 702 and ends at the second input 704, the touch sensor includes additional touch inputs that are scanned with a touch scan rate of 720 (e.g., a cycle of 1.38 ms). The touch inputs between the first input 702 and the second input 704 include a small amount of error. A computing system may determine a vector 712 corresponds to the same touch input based on the additional touch inputs provided based on the higher touch scan rate.

Figure 8:
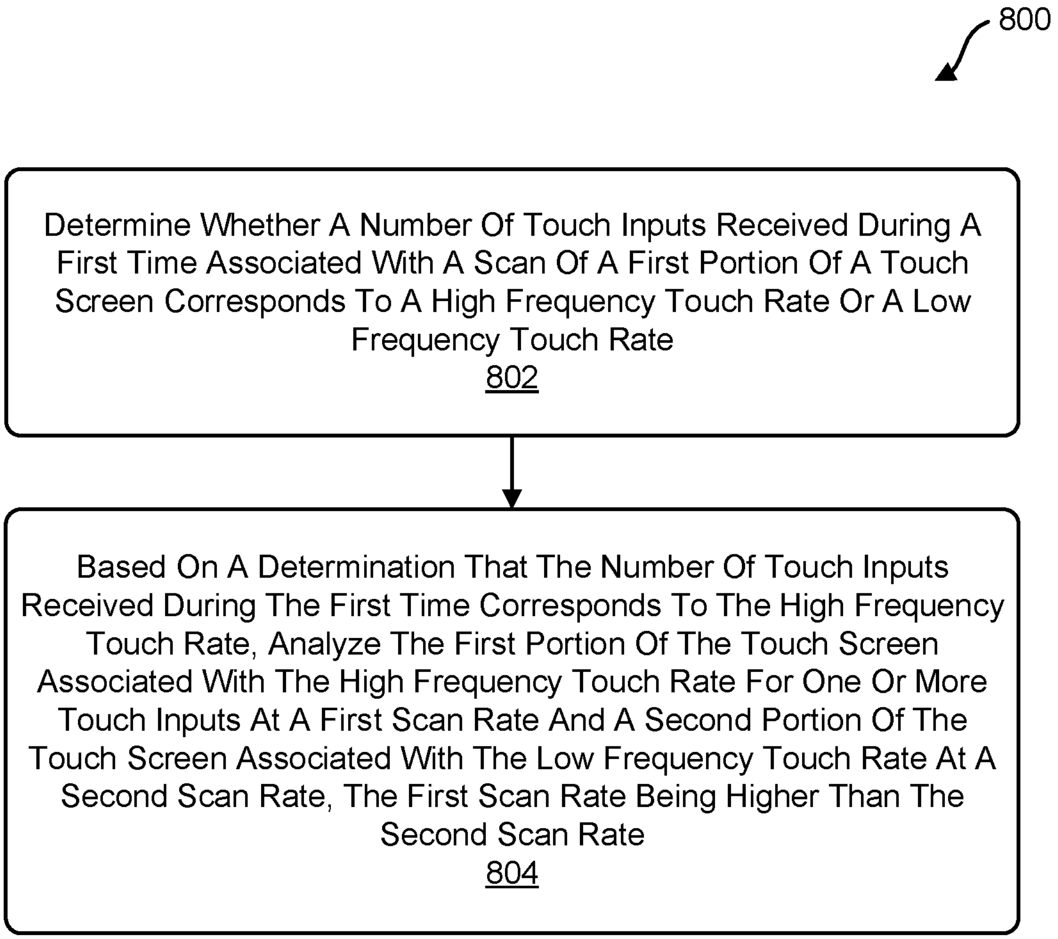
FIG. 8 is a flowchart illustrating an example of a method for processing touch input with an adaptive touch sensor, in accordance with certain aspects of the present disclosure.

FIG. 8 is a flowchart illustrating an example of a method 800 for processing audio data, in accordance with certain aspects of the present disclosure. The methods 500, 600 and 800 can be performed by a touch screen or by a computing device (or a component of the computing device, such as a chipset) having an touch screen, such as a mobile wireless communication device, a smart speaker, a camera, an XR device, a wireless-enabled vehicle, or another computing device. In one illustrative example, a computing system 900 can be configured to perform all or part of the methods 500, 600 and 800.

At block 802, the computing system (e.g., the computing system 900) is configured to determine whether a number of touch inputs received during a first time associated with a scan of a first portion of a touch screen corresponds to a high frequency touch rate or a low frequency touch rate. In some aspects, the first time is associated with a period of time during which a buffer accumulates touch inputs. Each touch input stored in the buffer includes an identification of a zone corresponding to each touch input.

According to various aspects, the touches can be grouped into exclusive zones. For example, the exclusive zones may correspond to cells that are associated a corresponding horizontal channel and vertical channel. The computing system is configured to receive at least one touch input sample that identifies a touched region of the touch screen, and map each touch input sample of the received at least one touch input sample to a particular zone within a group of zones associated with the touch screen. Each zone of the group of zones corresponds to at least one vertical channel and at least one horizontal channel of a touch screen controller.

At block 804, the computing system is configured to, based on a determination that the number of touch inputs received during first time corresponds to the high frequency touch rate, analyze the first portion of the touch screen associated with the high frequency touch rate for one or more touch inputs at a first scan rate and a second portion of the touch screen associated with the low frequency touch rate at a second scan rate. In some aspects, the high frequency touch rate is based on the number of touch inputs in a unit area of the touch screen within a time period being greater than a first threshold. An illustrative example of the first threshold is 3 touch inputs within a particular zone in a 30 second time period.

In one aspect, the computing system is configured to, based on the determination that the number of touch inputs received during first time corresponds to the high frequency touch rate, determine at least one horizontal channel of electrodes and at least one vertical channel of electrodes from the first portion to provide a current for detecting the first touch input. In this case, the computing system is configured to only provide current to horizontal channels and vertical channels that are active within the first time. As an example, the computing system is configured to provide instructions to a touch sensor controller to activate specific channels. Inactive vertical channels and horizontal channels are not provided current for the high frequency touch rate. The inactive vertical channels and horizontal channels do not consume current and reduce the total power consumption. According to this aspect, the computing system is configured to obtain a touch sample associated with the first portion of the touch screen at the first scan rate without considering any touch sample associated with the second portion of the touch screen.

At block 806, the computing system is configured to analyze, based on a determination that the number of touch inputs received during the first time corresponds to the low frequency touch rate, an entire touch screen for touch input at the second scan rate.

The computing system is configured to analyze, based on a determination that the number of touch inputs received during the first time corresponds to the low frequency touch rate, the first portion of the touch screen and the second portion of the touch screen at the second scan rate. In some aspects, the low frequency touch rate is based on the number of touch inputs in a unit area of the touch screen within a time period being less than or equal than the first threshold. The first scan rate may be higher than the second scan rate.

In some aspects, the computing system is also be configured to allocate different zones for the screen dynamically. For example, the computing system is configured to determine a number of touch inputs received via a third portion of the touch screen corresponds to the high frequency touch rate. For example, an application executing in the computing system can make available an additional input that is touchable, and the user may perform touch inputs within the third portion. Based on determining that the number of touch inputs received via the third portion of the touch screen corresponds to the high frequency touch rate, the computing system is configured to analyze the third portion of the touch screen for at least one touch input at the first scan rate. In other aspects, the computing system also be configured to dynamically deallocate different zones for the screen dynamically.

Additional aspects include improving the detected touch motions based on the high frequency touch rate. In one aspect, the computing system is configured to, at a second time after the first time, analyzing the touch screen for one or more additional touch inputs. Based on the additional touch inputs, the computing system is configured to determine a touch motion based the one or more touch inputs and the one or more additional touch inputs. For example, the computing system is configured to use the touch inputs to determine an accurate touch motion, as illustrated in FIG. 7B.

According to various aspects, the aspects described herein simplify application development by handling the inputs dynamically. The updating of the touch rate occurs based on touches provided by the user and the aspects described herein reduces complex implementations of changing a touch rate based on the application state.

In some examples, the processes described herein (e.g., methods 500, 600 and 800, and/or other process described herein) may be performed by a computing device or apparatus. In one example, the methods 500, 600 and 800 can be performed by a computing device including a touch screen having a computing architecture of the computing system 900 shown in FIG. 9.

The computing device can include any suitable device, such as a mobile device (e.g., a mobile phone), a desktop computing device, a tablet computing device, a wearable device (e.g., a virtual reality (VR) headset, an augmented reality (AR) headset, AR glasses, a network-connected watch or smartwatch, or other wearable device), a server computer, an autonomous vehicle or computing device of an autonomous vehicle, a robotic device, a television, and/or any other computing device with the resource capabilities to perform the methods described herein, including the methods 300 and 800. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of methods described herein. In some examples, the computing device may include a display, a network interface configured to communicate and/or receive the data, any combination thereof, and/or other component(s). The network interface may be configured to communicate and/or receive IP-based data or other type of data.

The components of the computing device can be implemented in circuitry. For example, the components can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein.

The methods 300 and 800 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the methods.

The methods 300 and 800, and/or other method or process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
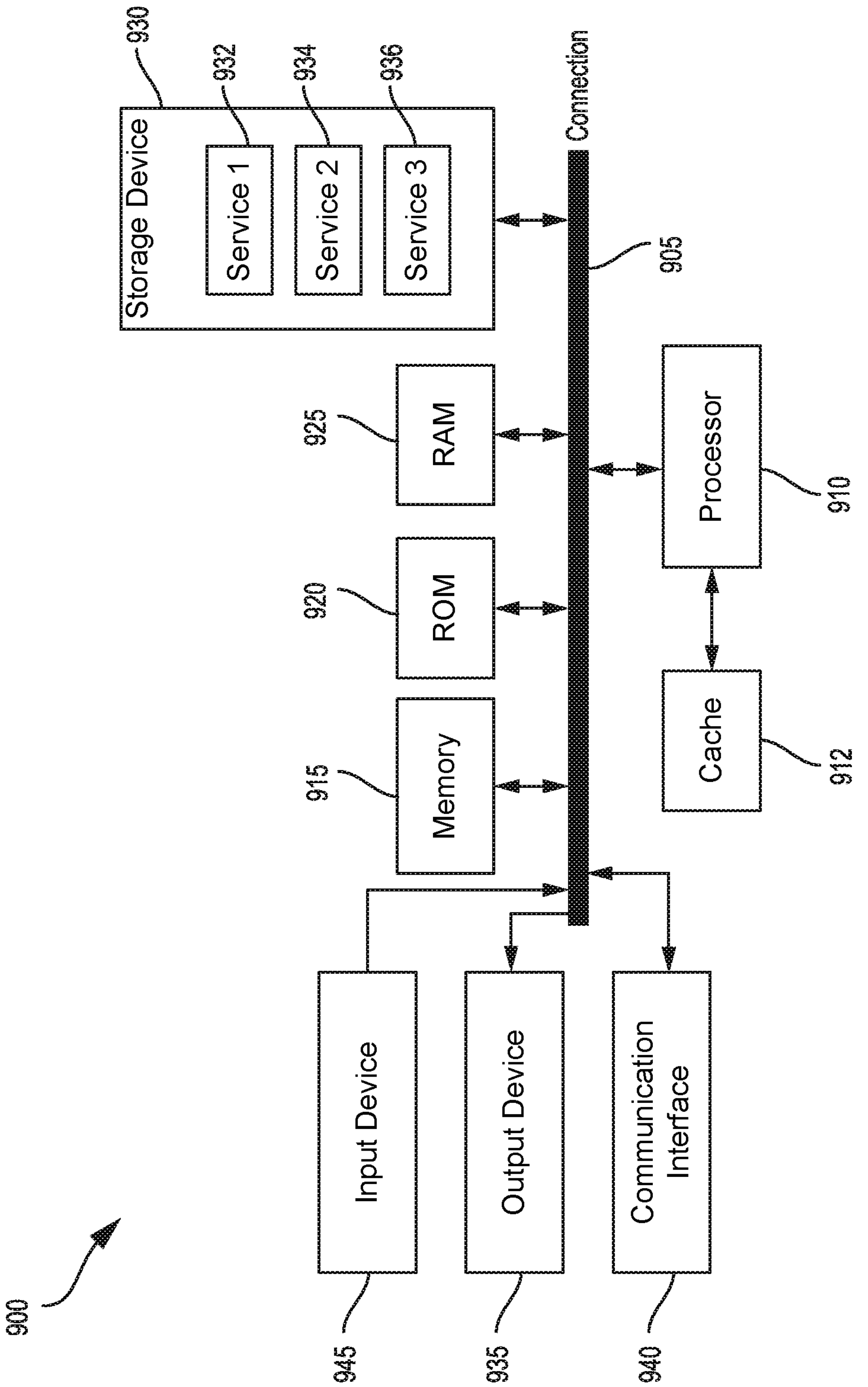
FIG. 9 is a diagram illustrating an example of a system for implementing certain aspects described herein.

FIG. 9 is a diagram illustrating an example of a system for implementing certain aspects of the present technology. In particular, FIG. 9 illustrates an example of computing system 900, which can be for example any computing device making up internal computing system, a remote computing system, a camera, or any component thereof in which the components of the system are in communication with each other using connection 905. Connection 905 can be a physical connection using a bus, or a direct connection into processor 910, such as in a chipset architecture. Connection 905 can also be a virtual connection, networked connection, or logical connection.

In some aspects, computing system 900 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example computing system 900 includes at least one processing unit (CPU or processor) 910 and connection 905 that couples various system components including system memory 915, such as ROM 920 and RAM 925 to processor 910. Computing system 900 can include a cache 912 of high-speed memory connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms. In some instances, multimodal systems can enable a user to provide multiple types of input/output to communicate with computing system 900. Computing system 900 can include communications interface 940, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a Bluetooth® wireless signal transfer, a BLE wireless signal transfer, an IBEACON® wireless signal transfer, an RFID wireless signal transfer, near-field communications (NFC) wireless signal transfer, dedicated short range communication (DSRC) wireless signal transfer, 802.11 WiFi wireless signal transfer, WLAN signal transfer, Visible Light Communication (VLC), Worldwide Interoperability for Microwave Access (WiMAX), IR communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, RAM, static RAM (SRAM), dynamic RAM (DRAM), ROM, programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 930 can include software services, servers, services, etc., that when the code that defines such software is executed by the processor 910, it causes the system to perform a function. In some aspects, a hardware service that performs a particular function can include the software component stored in a computer-readable medium in connection with the necessary hardware components, such as processor 910, connection 905, output device 935, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces can be configured to communicate and/or receive wired and/or wireless data, including data according to the 3G, 4G, 5G, and/or other cellular standard, data according to the Wi-Fi (802.11x) standards, data according to the Bluetooth™ standard, data according to the IP standard, and/or other types of data.

The components of the computing device can be implemented in circuitry. For example, the components can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but may have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as RAM such as synchronous dynamic random access memory (SDRAM), ROM, non-volatile random access memory (NVRAM), EEPROM, flash memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more DSPs, general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. A method of processing one or more touch inputs, comprising: determining whether a number of touch inputs received during a first time associated with a scan of a first portion of a touch screen corresponds to a high frequency touch rate or a low frequency touch rate; and based on a determination that the number of touch inputs received during the first time corresponds to the high frequency touch rate, analyzing the first portion of the touch screen associated with the high frequency touch rate for one or more touch inputs at a first scan rate and a second portion of the touch screen associated with the low frequency touch rate at a second scan rate, the first scan rate being higher than the second scan rate.

Aspect 2. The method of Aspect 1, further comprising: analyzing, based on a determination that the number of touch inputs received during the first time corresponds to the low frequency touch rate, the first portion of the touch screen and the second portion of the touch screen at the second scan rate.

Aspect 3. The method of any of Aspects 1 to 2, further comprising: analyzing, based on a determination that the number of touch inputs received during the first time corresponds to the low frequency touch rate, an entire touch screen for touch input at the second scan rate.

Aspect 4. The method of any of Aspects 1 to 3, wherein the high frequency touch rate is based on the number of touch inputs in a unit area of the touch screen within a time period being greater than a first threshold, and wherein the low frequency touch rate is based on the number of touch inputs in a unit area of the touch screen within a time period being less than or equal than the first threshold.

Aspect 5. The method of any of Aspects 1 to 4, further comprising: determining a number of touch inputs received via a third portion of the touch screen corresponds to the high frequency touch rate; and based on determining that the number of touch inputs received via the third portion of the touch screen corresponds to the high frequency touch rate, analyzing the third portion of the touch screen for at least one touch input at the first scan rate.

Aspect 6. The method of any of Aspects 1 to 5, wherein the first time is associated with a period of time during which a buffer accumulates touch inputs.

Aspect 7. The method of any of Aspects 1 to 6, wherein each touch input stored in the buffer includes an identification of a zone corresponding to each touch input.

Aspect 8. The method of any of Aspects 1 to 7, further comprising: receiving at least one touch input sample that identifies a touched region of the touch screen; and mapping each touch input sample of the received at least one touch input sample to a particular zone within a group of zones associated with the touch screen, wherein each zone of the group of zones corresponds to at least one vertical channel and at least one horizontal channel associated with a touch screen controller.

Aspect 9. The method of any of Aspects 1 to 8, further comprising: at a second time after the first time, analyzing the touch screen for one or more additional touch inputs; and determining a touch motion based the one or more touch inputs and the one or more additional touch inputs.

Aspect 10. The method of any of Aspects 1 to 9, further comprising: obtaining a touch sample associated with the first portion of the touch screen at the first scan rate without considering any touch sample associated with the second portion of the touch screen.

Aspect 11. The method of any of Aspects 1 to 10, further comprising: based on the determination that the number of touch inputs received during first time corresponds to the high frequency touch rate, determining at least one horizontal channel of electrodes and at least one vertical channel of electrodes from the first portion to provide a current for detecting the first touch input.

Aspect 12. An apparatus for processing one or more touch inputs. The apparatus includes at least one memory and at least one processor coupled to the at least one memory. The at least one processor is configured to: determine whether a number of touch inputs received during a first time associated with a scan of a first portion of a touch screen corresponds to a high frequency touch rate or a low frequency touch rate; and based on a determination that the number of touch inputs received during the first time corresponds to the high frequency touch rate, analyze the first portion of the touch screen associated with the high frequency touch rate for one or more touch inputs at a first scan rate and a second portion of the touch screen associated with the low frequency touch rate at a second scan rate, the first scan rate being higher than the second scan rate.

Aspect 13. The apparatus of Aspect 12, wherein the at least one processor is configured to: analyze, based on a determination that the number of touch inputs received during the first time corresponds to the low frequency touch rate, the first portion of the touch screen and the second portion of the touch screen at the second scan rate.

Aspect 14. The apparatus of any of Aspects 12 to 13, wherein the at least one processor is configured to: analyze, based on a determination that the number of touch inputs received during the first time corresponds to the low frequency touch rate, an entire touch screen for touch input at the second scan rate.

Aspect 15. The apparatus of any of Aspects 12 to 14, wherein the high frequency touch rate is based on the number of touch inputs in a unit area of the touch screen within a time period being greater than a first threshold, and wherein the low frequency touch rate is based on the number of touch inputs in a unit area of the touch screen within a time period being less than or equal than the first threshold.

Aspect 16. The apparatus of any of Aspects 12 to 15, wherein the at least one processor is configured to: determine a number of touch inputs received via a third portion of the touch screen corresponds to the high frequency touch rate; and based on determining that the number of touch inputs received via the third portion of the touch screen corresponds to the high frequency touch rate, analyze the third portion of the touch screen for at least one touch input at the first scan rate.

Aspect 17. The apparatus of any of Aspects 12 to 16, wherein the first time is associated with a period of time during which a buffer accumulates touch inputs.

Aspect 18. The apparatus of Aspect 17, wherein each touch input stored in the buffer includes an identification of a zone corresponding to each touch input.

Aspect 19. The apparatus of any of Aspects 12 to 18, wherein the at least one processor is configured to: receive at least one touch input sample that identifies a touched region of the touch screen; and map each touch input sample of the received at least one touch input sample to a particular zone within a group of zones associated with the touch screen, wherein each zone of the group of zones corresponds to at least one vertical channel and at least one horizontal channel associated with a touch screen controller.

Aspect 20. The apparatus of any of Aspects 12 to 19, wherein the at least one processor is configured to: at a second time after the first time, analyze the touch screen for one or more additional touch inputs; and determine a touch motion based the one or more touch inputs and the one or more additional touch inputs.

Aspect 21. The apparatus of any of Aspects 12 to 20, wherein the at least one processor is configured to: obtain a touch sample associated with the first portion of the touch screen at the first scan rate without considering any touch sample associated with the second portion of the touch screen.

Aspect 22. The apparatus of any of Aspects 12 to 21, wherein the at least one processor is configured to: based on the determination that the number of touch inputs received during first time corresponds to the high frequency touch rate, determine at least one horizontal channel of electrodes and at least one vertical channel of electrodes from the first portion to provide a current for detecting the first touch input.

Aspect 23: A non-transitory computer-readable medium comprising instructions which, when executed by one or more processors, cause the one or more processors to perform operations according to any of Aspects 1 to 12.

Aspect 24: An apparatus comprising means for performing operations according to any of Aspects 1 to 12.

What is claimed is:

1. A method of processing one or more touch inputs, comprising:

determining whether a number of touch inputs received during a first time associated with a scan of a first portion of a touch screen corresponds to a high frequency touch rate or a low frequency touch rate, wherein the first time is associated with a period of time during which a buffer accumulates touch inputs, each touch input stored in the buffer including an identification of a zone corresponding to each touch input; and based on a determination that the number of touch inputs received during the first time corresponds to the high frequency touch rate, analyzing the first portion of the touch screen associated with the high frequency touch rate for one or more touch inputs at a first scan rate and a second portion of the touch screen associated with the low frequency touch rate at a second scan rate, the first scan rate being higher than the second scan rate.

2. The method of claim 1, further comprising:

analyzing, based on a determination that the number of touch inputs received during the first time corresponds to the low frequency touch rate, the first portion of the touch screen and the second portion of the touch screen at the second scan rate.

3. The method of claim 1, further comprising:

analyzing, based on a determination that the number of touch inputs received during the first time corresponds to the low frequency touch rate, an entire touch screen for touch input at the second scan rate.

4. The method of claim 1, wherein the high frequency touch rate is based on the number of touch inputs in a unit area of the touch screen within a time period being greater than a first threshold, and wherein the low frequency touch rate is based on the number of touch inputs in a unit area of the touch screen within a time period being less than or equal than the first threshold.

5. The method of claim 1, further comprising:

determining a number of touch inputs received via a third portion of the touch screen corresponds to the high frequency touch rate; and based on determining that the number of touch inputs received via the third portion of the touch screen corresponds to the high frequency touch rate, analyzing the third portion of the touch screen for at least one touch input at the first scan rate.

6. The method of claim 1, further comprising:

receiving at least one touch input sample that identifies a touched region of the touch screen; and mapping each touch input sample of the received at least one touch input sample to a particular zone within a group of zones associated with the touch screen, wherein each zone of the group of zones corresponds to at least one vertical channel and at least one horizontal channel associated with a touch screen controller.

7. The method of claim 1, further comprising:

at a second time after the first time, analyzing the touch screen for one or more additional touch inputs; and determining a touch motion based the one or more touch inputs and the one or more additional touch inputs.

8. The method of claim 1, further comprising:

obtaining a touch sample associated with the first portion of the touch screen at the first scan rate without considering any touch sample associated with the second portion of the touch screen.

9. The method of claim 1, further comprising:

based on the determination that the number of touch inputs received during first time corresponds to the high frequency touch rate, determining at least one horizontal channel of electrodes and at least one vertical channel of electrodes from the first portion to provide a current for detecting at least one touch input.

10. An apparatus for processing one or more touch inputs, comprising:

at least one memory; and at least one processor coupled to the at least one memory and configured to:

determine whether a number of touch inputs received during a first time associated with a scan of a first portion of a touch screen corresponds to a high frequency touch rate or a low frequency touch rate, wherein the first time is associated with a period of time during which a buffer accumulates touch inputs, each touch input stored in the buffer including an identification of a zone corresponding to each touch input; and based on a determination that the number of touch inputs received during the first time corresponds to the high frequency touch rate, analyze the first portion of the touch screen associated with the high frequency touch rate for one or more touch inputs at a first scan rate and a second portion of the touch screen associated with the low frequency touch rate at a second scan rate, the first scan rate being higher than the second scan rate.

11. The apparatus of claim 10, wherein the at least one processor is configured to:

analyze, based on a determination that the number of touch inputs received during the first time corresponds to the low frequency touch rate, the first portion of the touch screen and the second portion of the touch screen at the second scan rate.

12. The apparatus of claim 10, wherein the at least one processor is configured to:

analyze, based on a determination that the number of touch inputs received during the first time corresponds to the low frequency touch rate, an entire touch screen for touch input at the second scan rate.

13. The apparatus of claim 10, wherein the high frequency touch rate is based on the number of touch inputs in a unit area of the touch screen within a time period being greater than a first threshold, and wherein the low frequency touch rate is based on the number of touch inputs in a unit area of the touch screen within a time period being less than or equal than the first threshold.

14. The apparatus of claim 10, wherein the at least one processor is configured to:

determine a number of touch inputs received via a third portion of the touch screen corresponds to the high frequency touch rate; and based on determining that the number of touch inputs received via the third portion of the touch screen corresponds to the high frequency touch rate, analyze the third portion of the touch screen for at least one touch input at the first scan rate.

15. The apparatus of claim 10, wherein the at least one processor is configured to:

receive at least one touch input sample that identifies a touched region of the touch screen; and map each touch input sample of the received at least one touch input sample to a particular zone within a group of zones associated with the touch screen, wherein each zone of the group of zones corresponds to at least one vertical channel and at least one horizontal channel associated with a touch screen controller.

16. The apparatus of claim 10, wherein the at least one processor is configured to:

at a second time after the first time, analyze the touch screen for one or more additional touch inputs; and determine a touch motion based the one or more touch inputs and the one or more additional touch inputs.

17. The apparatus of claim 10, wherein the at least one processor is configured to:

obtain a touch sample associated with the first portion of the touch screen at the first scan rate without considering any touch sample associated with the second portion of the touch screen.

18. The apparatus of claim 10, wherein the at least one processor is configured to:

based on the determination that the number of touch inputs received during first time corresponds to the high frequency touch rate, determine at least one horizontal channel of electrodes and at least one vertical channel of electrodes from the first portion to provide a current for detecting at least one touch input.

19. A non-transitory computer-readable medium comprising instructions which, when executed by one or more processors, cause the one or more processors to:

determine whether a number of touch inputs received during a first time associated with a scan of a first portion of a touch screen corresponds to a high frequency touch rate or a low frequency touch rate, wherein the first time is associated with a period of time during which a buffer accumulates touch inputs, each touch input stored in the buffer including an identification of a zone corresponding to each touch input; and based on a determination that the number of touch inputs received during the first time corresponds to the high frequency touch rate, analyze the first portion of the touch screen associated with the high frequency touch rate for one or more touch inputs at a first scan rate and a second portion of the touch screen associated with the low frequency touch rate at a second scan rate, the first scan rate being higher than the second scan rate.

20. The non-transitory computer-readable medium of claim 19, wherein the instructions, when executed by the one or more processors, cause the one or more processors to:

analyze, based on a determination that the number of touch inputs received during the first time corresponds to the low frequency touch rate, the first portion of the touch screen and the second portion of the touch screen at the second scan rate.

* * * * *